United States Patent
Ijäs et al.

(10) Patent No.: US 9,086,784 B2
(45) Date of Patent: Jul. 21, 2015

(54) METHOD, APPARATUS AND COMPUTER PROGRAM FOR PROVIDING USER-SPECIFIC INFORMATION ON A GRAPHICAL USER INTERFACE

(75) Inventors: Jari Ijäs, Espoo (FI); Jussi Hakunti, Turku (FI); Antti Tapiola, Kisko (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 78 days.

(21) Appl. No.: 13/588,736

(22) Filed: Aug. 17, 2012

(65) Prior Publication Data

US 2013/0047122 A1 Feb. 21, 2013

(30) Foreign Application Priority Data

Aug. 18, 2011 (EP) .................................... 11177975

(51) Int. Cl.
*G06F 3/14* (2006.01)
*G06F 3/0482* (2013.01)

(52) U.S. Cl.
CPC .................................... *G06F 3/0482* (2013.01)

(58) Field of Classification Search
CPC .................................... G06F 3/14; G06F 3/17
USPC .......... 715/200–277, 700–867; 700/701–866; 709/201–229; 705/50–79; 345/30–111; 345/619; 455/420; 382/131
See application file for complete search history.

(56) References Cited

U.S. PATENT DOCUMENTS

| | | | | |
|---|---|---|---|---|
| 7,030,890 | B1 * | 4/2006 | Jouet et al. | 345/619 |
| 7,783,978 | B1 | 8/2010 | Andrews et al. | |
| 8,578,271 | B2 * | 11/2013 | Laugwitz et al. | 715/712 |
| 2008/0109717 | A1 * | 5/2008 | Krauter | 715/255 |
| 2009/0307623 | A1 * | 12/2009 | Agarawala et al. | 715/765 |
| 2011/0010658 | A1 * | 1/2011 | Nash et al. | 715/784 |
| 2011/0212717 | A1 * | 9/2011 | Rhoads et al. | 455/420 |
| 2013/0022251 | A1 * | 1/2013 | Chen et al. | 382/131 |
| 2013/0151952 | A1 * | 6/2013 | Yamamoto et al. | 715/243 |

OTHER PUBLICATIONS

European Search Report mailed Dec. 22, 2011 for European Patent Application No. 11177975.7.

* cited by examiner

*Primary Examiner* — Ruay Ho
(74) *Attorney, Agent, or Firm* — Banner & Witcoff, Ltd.

(57) ABSTRACT

User-specific information content packages are arranged into a sequence of selectable objects, wherein each user-specific information content package includes at least visual content, and wherein the sequence includes a first part of selectable objects waiting for to be displayed on a graphical user interface and a second part of selectable objects currently displayed on the graphical user interface. The selectable objects in the second part are caused to be displayed on the graphical user interface as a flow of selectable objects such that, while the selectable objects flow on the graphical user interface, at least one selectable object from the first part is moved to the second part and at least one selectable object from the second part is removed from the second part.

19 Claims, 4 Drawing Sheets

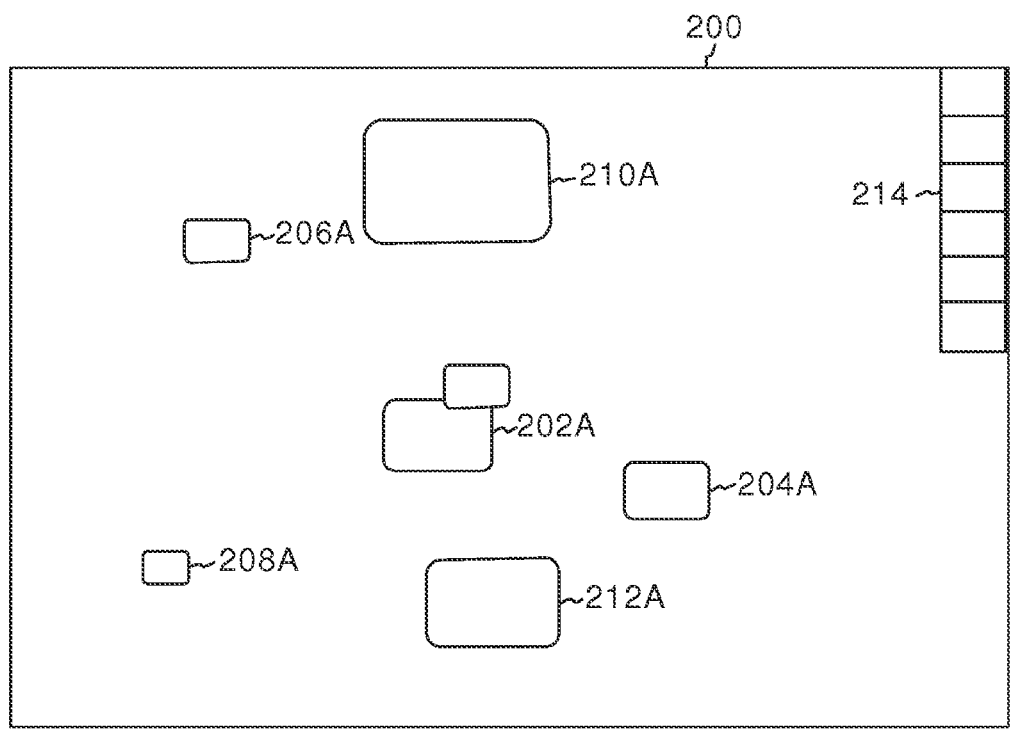

METHOD, APPARATUS AND COMPUTER PROGRAM FOR PROVIDING USER-SPECIFIC INFORMATION ON A GRAPHICAL USER INTERFACE

CROSS REFERENCE TO RELATED APPLICATION

This application claims the priority of European Patent Application No. 11177975.7 filed on Aug. 18, 2011 in the EPO (European Patent Office), the disclosure of which is incorporated herein in their entirety by reference.

FIELD OF THE INVENTION

The invention relates to providing information to a user. More specifically, the invention relates to a method, apparatus and computer program for providing user-specific information on a graphical user interface.

BACKGROUND OF THE INVENTION

There exists various ways to provide user with information, e.g. news or other headlines, in a graphical user interface on a display. Relating to news, one common way is to provide on a list of headlines or short summaries of the news where each headline may be accompanied with a small image relating to the headline. When a user selects the headline or the image e.g. with a mouse click, the user is shown a complete and longer version of the story.

Another common way to provide information feeds is, for example, RDF Site Summary (RSS) a feed. A user subscribes to a feed by entering into a RSS reader the feed's Uniform Resource Identificator (URI) or by clicking a feed icon in a web browser that initiates the subscription process. The RSS reader checks the user's subscribed feeds regularly for new work, downloads any updates that it finds, and provides a user interface to monitor and read the feeds. RSS allows users to avoid manually inspecting all of the websites they are interested in, and instead subscribe to websites such that all new content is pushed onto their browsers when it becomes available.

A common feature with the above prior art solutions is that information is provided as a list in the form of a feed or web page that is scrollable. The amount of information content relating to each item in the list may vary.

Based on the above, there is a need for a solution that would provide a new and intuitive way to present information content items in a graphical user interface.

SUMMARY

According to a first aspect of the invention, there is provided a method comprising arranging user-specific information content packages into a sequence of selectable objects, wherein each user-specific information content package comprises at least visual content, and wherein the sequence comprises a first part of selectable objects waiting for to be displayed on a graphical user interface and second part selectable objects currently displayed on the graphical user interface; causing display of the selectable objects in the second part on the graphical user interface as a flow of selectable objects such that, while the selectable objects flow on the graphical user interface, at least one selectable object from the first part is moved to the second part and at least one selectable object from the second part is removed from the second part, wherein in at least one point of time at least one selectable object displayed on the graphical user interface is more visually emphasized on the graphical user interface than the remaining selectable objects simultaneously displayed on the graphical user interface; and allowing user selection of a selectable object displayed on the graphical user interface.

In one embodiment, the method further comprises receiving at least one user-specific information content package from a server.

In one embodiment, the method further comprises prior to receiving user-specific information content packages from the server: sending, to the server, user profile information.

In one embodiment, the method further comprises removing a selectable object from the graphical user interface when a predetermined condition is reached.

In one embodiment, the predetermined condition comprises at least one of: position of the selectable object in the second part currently visible on the graphical user interface; and location of the selectable object on the graphical user interface.

In one embodiment, a user-specific information content package comprises an address to a source content, wherein the method further comprises receiving a selection of a selectable object displayed on the graphical user interface; removing the selected selectable object from the second part, and opening content associated with the link relating to the selectable object.

In one embodiment, a user-specific information content package comprises an address, wherein the method further comprises receiving a selection of a selectable object displayed on the graphical user interface; and initiating sending of an indication to the address that the selectable object has been selected.

In one embodiment, the method further comprises setting a threshold for the amount of selectable objects in the first part, and initiating a process of receiving new selectable objects when the amount of selectable objects in the first part is less than the threshold.

In one embodiment, the method further comprises setting a period of validity for a selectable object, and removing the selectable object from the sequence when the period of validity has expired.

In one embodiment, the method further comprises setting a priority for at least one selectable object in the first part and using the priority information when moving selectable objects from the first part to the second part.

In one embodiment, the flow of selectable objects is a continuous or a gradual flow.

In one embodiment, a selectable object comprises an application.

According to a second aspect of the invention, there is provided a computer program comprising program code configured to perform, when executed by a processor, the method of the invention.

In one embodiment, the computer program is embodied on a computer readable medium.

According to a second aspect of the invention, there is provided an apparatus comprising means for arranging user-specific information content packages into a sequence of selectable objects, wherein each user-specific information content package comprises at least visual content, and wherein the sequence comprises a first part of selectable objects waiting for to be displayed on a graphical user interface and a second part selectable objects currently displayed on the graphical user interface; means for causing display of the selectable objects in the second part on the graphical user interface as a flow of selectable objects such that, while the selectable objects flow on the graphical user interface, at least one selectable object from the first part is moved to the second part and at least one selectable object from the second part is removed from the second part, wherein in at least one point of time at least one selectable object displayed on the graphical user interface is more visually emphasized on the graphical user interface than the remaining selectable objects simultaneously displayed on the graphical user interface; and means for allowing user selection of a selectable object displayed on the graphical user interface.

In one embodiment, the apparatus further comprises means for receiving user-specific information content packages from a server.

In one embodiment, the apparatus further comprises means for sending, to the server, user profile information prior to receiving user-specific information content packages from the server.

In one embodiment, the apparatus further comprises means for removing a selectable object from the graphical user interface when a predetermined condition is reached.

In one embodiment, the predetermined condition comprises at least one of: position of the selectable object in the second part currently visible on the graphical user interface; and location of the selectable object on the graphical user interface.

In one embodiment, wherein a user-specific information content package comprises an address to a source content, wherein the apparatus further comprises means for receiving a selection of a selectable object displayed on the graphical user interface; means for removing the selected selectable object from the second part and means for opening content associated the address relating to the selectable object.

In one embodiment, wherein a user-specific information content package comprises an address, wherein the apparatus further comprises means for receiving a selection of a selectable object displayed on the graphical user interface; and means for initiating sending of an indication to the address that the selectable object has been selected.

In one embodiment, the apparatus further comprises means for setting a threshold for the amount of selectable objects in the first part, and means for initiating a process of receiving new selectable objects when the amount of selectable objects in the first part is less than the threshold.

In one embodiment, the apparatus further comprises means for setting a period of validity for a selectable object, and means for removing the selectable object from the sequence when the period of validity has expired.

In one embodiment, the apparatus further comprises means for setting a priority for at least one selectable object in the first part and means for using the priority information when moving selectable objects from the first part to the second part.

In one embodiment, the flow of selectable objects is a continuous or a gradual flow.

In one embodiment, a selectable object comprises an application.

According to a second aspect of the invention, there is provided an apparatus comprising at least one processor and at least one memory comprising program code, which when executed by the at least one processor, cause the apparatus to: arrange user-specific information content packages into a sequence of selectable objects, wherein each user-specific information content package comprises at least visual content, and wherein the sequence comprises a first part of selectable objects waiting for to be displayed on a graphical user interface and a second part of selectable objects currently displayed on the graphical user interface; cause display of the selectable objects in the second part on the graphical user interface as a flow of selectable objects such that, while the selectable objects flow on the graphical user interface, at least one selectable object from the first part is moved to the second part and at least one selectable object from the second part is removed from the second part, wherein in at least one point of time at least one selectable object displayed on the graphical user interface is more visually emphasized on the graphical user interface than the remaining selectable objects simultaneously displayed on the graphical user interface; and allow user selection of a selectable object displayed on the graphical user interface.

BRIEF DESCRIPTION OF THE DRAWINGS

The accompanying drawings, which are included to provide a further understanding of the invention and constitute a part of this specification, illustrate embodiments of the invention and together with the description help to explain the principles of the invention. In the drawings:

FIG. 1 is a block diagram illustrating a method according to one embodiment of the invention;

FIGS. 2A-2C illustrate a continuous flow of selectable objects on a graphical user interface according to one embodiment of the invention;

DETAILED DESCRIPTION OF THE INVENTION

Figure 2B:
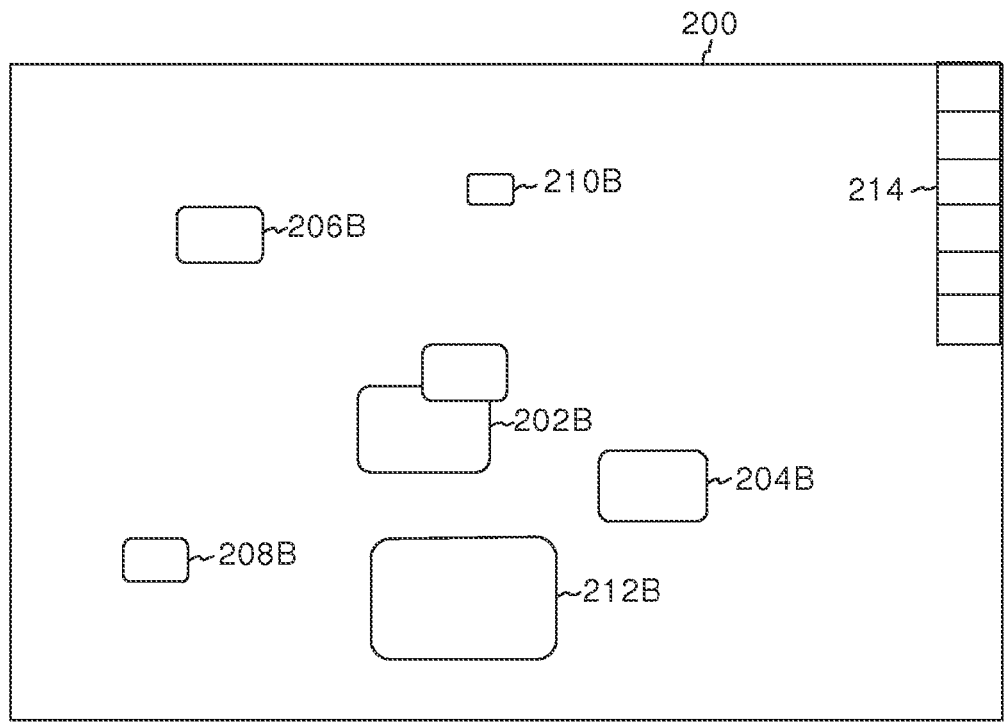

Reference will now be made in detail to the embodiments of the present invention, examples of which are illustrated in the accompanying drawings.

FIG. 1 is a block diagram illustrating a method according to one embodiment of the invention. At step 100 user-specific information content packages are arranged into a sequence of selectable objects. Each information content package comprises visual content. In one embodiment, one or more information content packages may also comprise audio. In one embodiment, at least some of the user-specific information content packages are received from a server. Prior to receiving the user-specific information content packages, an apparatus may have sent to the server user profile information so that the server is able to send user-selected content to the apparatus. The user profile information may, for example, determine the type of content the user wishes to receive. In another embodiment, the user may have determined a user profile in the apparatus. The user profile determines what kind of information may be included from the apparatus into the sequence. The user profile may e.g. determine that the user is interested in sports, politics, games and finance. In response to the set user profile, at least some of the user-specific information packages relates to these areas.

At step 102 the selectable objects are caused to be displayed on a graphical user interface as a flow of selectable objects such that, while the selectable objects flow on the graphical user interface, at least one selectable object from the first part is moved to the second part and at least one selectable object from the second part is removed from the second part, and wherein in at least one point of time a selectable object displayed on the graphical user interface is visually emphasized more than the remaining selectable objects simultaneously displayed on the graphical user interface. At step 104 user selection of a selectable object displayed on the graphical user interface is allowed.

In one embodiment of FIG. 1, in the beginning there is a certain amount of selectable objects in the sequence. Most of the selectable objects are in the first part (not yet displayed on the graphical user interface). When the selectable objects are removed from the second part of the sequence (i.e. from the graphical user interface), a new object may come visible on the graphical user interface from the first part. The first and second parts are not necessarily synchronized with each other, i.e. that when a selectable object is removed from the second part, a new object may not be immediately moved from the first part to the second part. In fact, in one embodiment, the amount of selectable objects simultaneously on the graphical user interface may vary depending on how selectable objects are moved from the first part to the second part.

Depending on the amount of the selectable objects in the first part, it may take some time (e.g. hours or days) before the first part becomes empty if it not supplemented before that. In one embodiment, a threshold is set for the amount of selectable objects in the first part. When the amount of selectable objects in the first part is less than the threshold, a process of receiving new selectable objects is initiated. Initiating refers e.g. to requesting new selectable objects e.g. from an external server.

In one embodiment, the apparatus may not have an active network connection when the first part reaches the threshold. In this kind of situation, the first part may be supplemented with selectable objects that are formed based on the information stored on the apparatus. The first part may thus be supplemented e.g. with images, movie clips, folder links, social network related information, applications etc.

In another embodiment of FIG. 1, a period of validity is set for a selectable object. For example, a selectable object may comprise information for the user that is valid only on a specific day. Thus, if such selectable object exists in the first part before the specific day or other time period, it will not be moved to the second part of the sequence before the period of validity. For example, a selectable object in the first part may have a validity setting that the selectable object is valid only on tomorrow. Thus the selectable object is not moved to the second part until the validity setting is met. If the selectable object remains in the sequence although the period of validity has already passed, the selectable object is removed from the first part.

In another embodiment of FIG. 1, a priority is set for at least one selectable object in the first part. The priority setting may affect when a selectable object moves from the first part into the second part (and thus is displayed on the graphical user interface).

A user-specific information content package refers to any content that can be displayed on the graphical user interface or otherwise presented by the apparatus in a form of visual and/or audio content. The information content package may include content in a form that is as such suitable as a selectable object. In another embodiment, the apparatus may process the content package to form a selectable object, e.g. by using only a portion of the information content of a user-specific information content package, by decoding the user-specific information content package before forming the selectable object or by processing the information content package in any other way.

"Flow of selectable objects" as used herein refers to the concept in which selectable objects displayed on the graphical user interface move on the graphical user interface continuously or gradually.

Figure 2C:
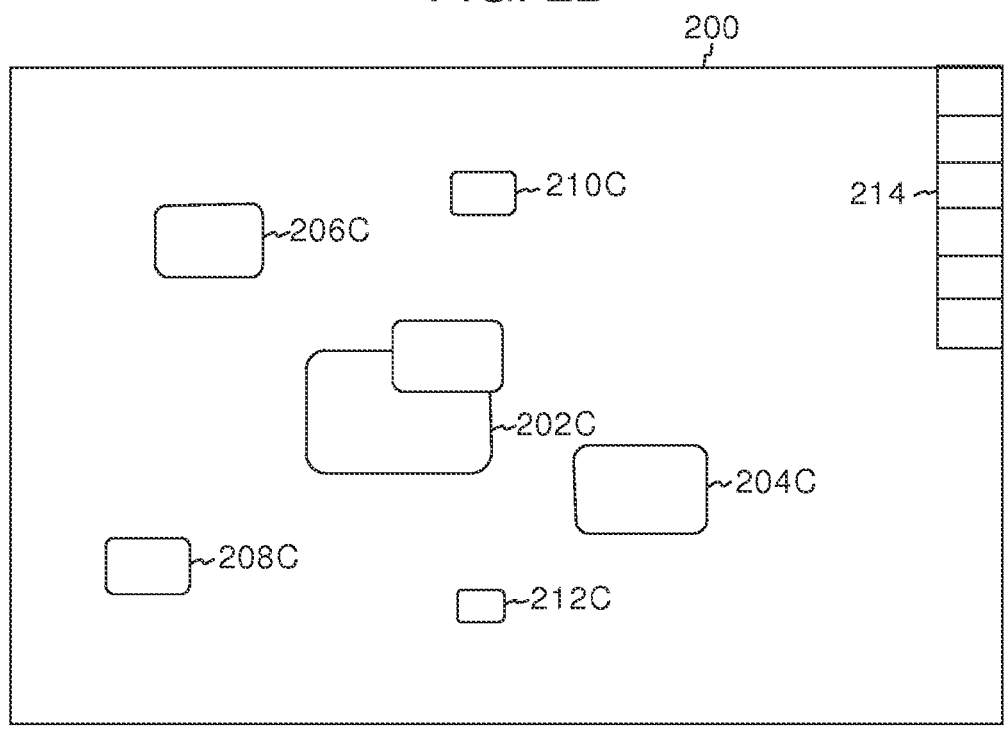

FIGS. 2A-2C illustrate a continuous flow of selectable objects on a graphical user interface 200 according to one embodiment of the invention.

In FIG. 2A the graphical user interface 200 includes a set of selectable objects 202A-212A. The graphical user interface 200 may include also a menu 214 for selecting additional functions (e.g. images, movies, settings, email, web browser etc.). In this example, each selectable object 202A-212A comprises visual content and a link to a web page. A selectable object may comprise also audible content. A user is able to select any of the selectable objects 202A-212A from the graphical user interface e.g. with a pointing device or the selections ability may be limited only to some selectable objects. As can be seen from FIG. 2A, a selectable object 210A is currently the largest one and a selectable object 208A the smallest one. The user may not yet be able to read the selectable object 208A properly due to the small size.

FIG. 2B discloses a situation where the continuous flow of the selectable objects 202B-212B has advanced one step compared to the situation in FIG. 2A. Previously, the selectable object 210A in FIG. 2A was the largest one and "the closest" one to the user. In FIG. 2B, a new smaller selectable object 210B has replaced the previous selectable object 210A. The apparatus having the graphical user interface 200 has arranged the selectable objects into a sequence. The sequence comprises two parts: the first part comprises selectable objects waiting for to be displayed on the graphical user interface 200, and the second part comprises selectable objects currently displayed on the graphical user interface 200. In terms of FIGS. 2A and 2B, the selectable object 210C was in the first part in the situation of FIG. 2B. When the situation changes to FIG. 2C, the selectable object 210C is moved from the first part to the second part of the sequence, and thus it is displayed on the graphical user interface 200. Similarly, each selectable object 202B-208B and 212B has become a bit larger compared to the situation in FIG. 2A. In FIG. 2B, the selectable object 212B is now the largest one.

FIG. 2C discloses a situation where the continuous flow of the selectable objects 202C-212C has advanced again one step compared to the situation in FIG. 2B. In FIG. 2C, a new smaller selectable object 212C has replaced the previous selectable object 212B. Similarly, each selectable object 202C-210C has become a bit larger compared to the situation in FIG. 2B. In FIG. 2C, the selectable object 202C is now the largest one. In one embodiment, when a user selects e.g. the selectable object 202C, a web page associated with the link relating to this selectable object 202C is opened. During the opening, content on the web page may have to be downloaded if the content is not available in an apparatus providing the graphical user interface. If receiving a selection of a selectable object from the user, the continuous flow may be suspended while the user is viewing the web page relating to the selected object. In another embodiment, the continuous flow of selectable objects may continue even if the user is viewing the web page relating to the selected object. The web page may e.g. fill the graphical user interface only partially.

In one embodiment, the transition from the situation of FIG. 2A to the situation of FIG. 2C is not gradual but continuous so that the movement of the selectable objects is continuous and natural. In another embodiment, the selectable object may move step by step.

In one embodiment of FIGS. 2A-2C, the location of a selectable object may not remain exactly same in the continuous flow process. Instead, the selectable object may drift in any direction on the graphical user interface 200 during the continuous flow.

In one embodiment of FIGS. 2A-2C, a selectable object is removed from the graphical user interface when a predetermined condition is reached. The predetermined condition may comprise position of the selectable object in the second part currently visible on the graphical user interface. When the selectable object is the first in the second part (i.e. it is displayed as the largest one on the graphical user interface) and a user does not select the selectable object, the selectable object may be removed from the graphical user interface 200 as the continuous flow proceeds. In another embodiment, the selectable object may be removed from the graphical user interface if it reaches a certain location on the graphical user interface. When a selectable object is no longer visible on the graphical user interface 200, it is not any more included in the second part of the sequence. In one embodiment, the removed selectable object may be placed again into the first part of the sequence for appearing again on the graphical user interface 200.

In one embodiment, also audio content may relate to one or more selectable objects. For example, when a selectable object is more visually emphasized (e.g. larger) on the graphical user interface than the remaining selectable objects simultaneously displayed on the graphical user interface and if audible content has been associated with the selectable object, the audio content may be played back then. In another embodiment, when a selectable object includes video content, the video content may be in a paused state until the selectable object is more visually emphasized (e.g. larger) on the graphical user interface than the remaining selectable objects simultaneously displayed on the graphical user interface. This may then trigger the video content to be played back. This enables a situation that only one selectable object comprising video content is played back at a time.

FIGS. 2A-2C disclosed that the order of the selectable objects (compared to the other selectable objects) in the sequence remains the same with the exception that the largest selectable object was replaced with a new (smallest) selectable object between the steps. In another embodiment, the order between the selectable objects in the sequence may vary. For example, the selectable object 208B in FIG. 2B could become the largest selectable object in FIG. 2C instead of the selectable object 202C.

Furthermore, in FIGS. 2A-2C, the sequence of selectable objects included the same objects. In another embodiment, the objects may change in the sequence (i.e. the second part). For example, the selectable object 204C in FIG. 2C could be a completely different object than the selectable object 204B in FIG. 2B. This means that a selectable object of the first part may replace any selectable object of the second part. In another embodiment, the selectable objects in the second part of the sequence may remain the same but their relative position in the sequence may change during the flow. For example, the selectable object 210B in FIG. 2B may appear as the selectable object 212C in FIG. 2C.

FIGS. 2A-2C disclosed that the flow of selectable objects is a continuous flow. In another embodiment, the flow is not a continuous flow but a gradual flow. The gradual flow means that the size and/or location of the selectable object changes gradually and there is no continuous movement seen on the graphical user interface but a stepwise movement.

FIGS. 2A-2C disclosed that in at least one point of time at least one selectable object (e.g. the selectable object 202C) displayed on the graphical user interface is more visually emphasized on the graphical user interface than the remaining selectable objects simultaneously displayed on the graphical user interface. In FIGS. 2A-2C emphasizing meant size of the selectable objects. In another embodiment emphasizing may mean other than object size, e.g. accuracy, visibility etc.

In one embodiment, a selectable object may include content e.g. from a social network application, e.g. status information of other people, recent posts etc.

Figure 3A:
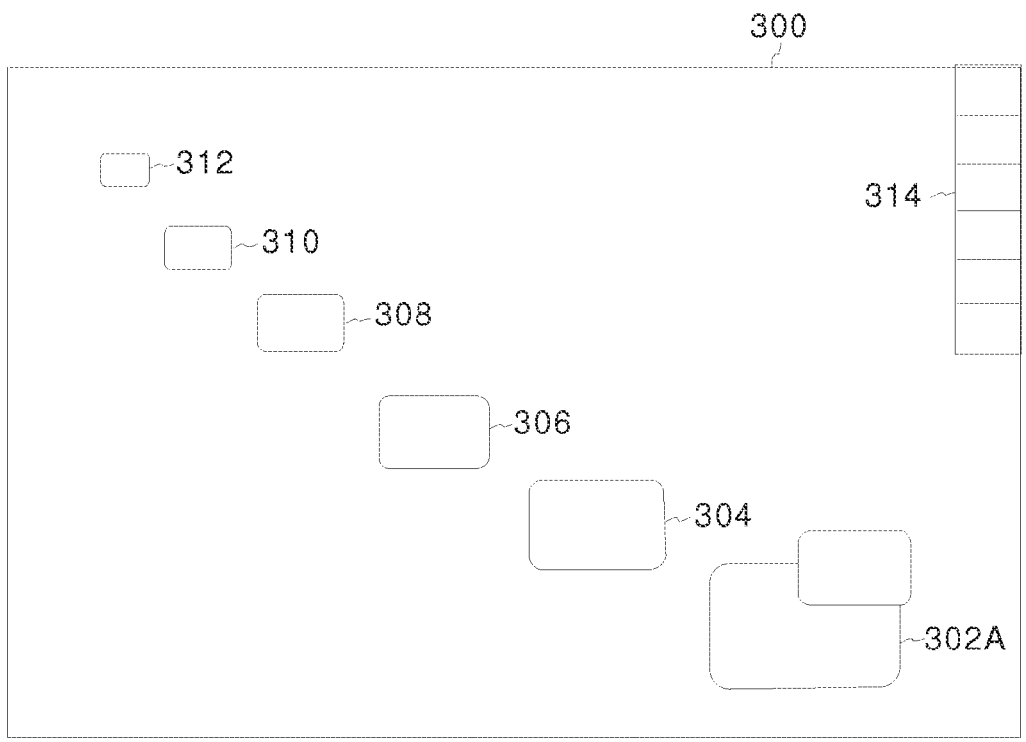
FIG. 3A illustrates a flow of selectable objects on a graphical user interface according to another embodiment of the invention.

FIG. 3A illustrates a flow of selectable objects on a graphical user interface 300 according to one embodiment of the invention. The graphical user interface 300 of FIG. 3A differs from the graphical user interface 200 of FIGS. 2A-2C in that the selectable objects 302-312 appear as a growing sequence into a certain direction on the graphical user interface 300. The graphical user interface 300 may include also a menu 314 for selecting additional functions (e.g. images, movies, setting, email etc.)

Although FIGS. 2A-2C and 3A disclose specific ways how to arrange the sequence of selectable objects, it is evident that the flow of selectable objects may be displayed on the graphical user interface in any other appropriate manner or by using any other appropriate pattern.

Figure 3B:
FIG. 3B is a simplified view of a graphical user interface according to another embodiment of the invention

FIG. 3B is a simplified view of a graphical user interface 300 according to another embodiment of the invention. When the user has selected the object 302A from FIG. 3A, a new view 302B opens into the graphical user interface 300. The view 302B displays a more detailed view of the selected selectable object 302A.

For example, the selected object 302A may be an advertisement, which is then displayed in the view 302B in a more detailed manner. In another embodiment, the selected object may include content which is stored in an apparatus having the graphical user interface 300. For example, the selectable object 302A may comprise a photo, video clip or any other file stored in the apparatus. When the user selects the selectable object 302A, the photo is shown in an enlarged form in the view 302B. Alternatively, the photo comprised in the selectable object 302A may be link to a specific folder in the apparatus. In other words, the user selects the selectable object 302A, and the view 302B displays a folder that includes one or more viewable photos. In another embodiment, the selectable object 302A is an icon or other small image, which when selected by the user, starts execution of an application (e.g. a game etc.) in the view 302B.

In the above embodiments relating to FIG. 3B, a link or an address may be associated with the selectable object. The link may direct the user to external content, and when selecting the selectable object 302A, the external content may be displayed in the view 302B. The external content may be displayed also in a separate application, e.g. in a web browser.

The link may also be an internal link within the apparatus to internal content, e.g. to social networking content, videos, images, other files etc. Yet in another embodiment, the selectable object may be associated with a link or an address. When the user selects the selectable object 302A (e.g. an advertisement), the object is displayed in a more detailed manner in the view 302B. The link or address, however, does not lead to any content. Instead, the link is a "reporting" link. In other words, when the user makes the selection, an indication sending is initiated to the address or link that the user has selected the selectable object 302A. Sending of the indication may be transparent to the user.

Figure 4:
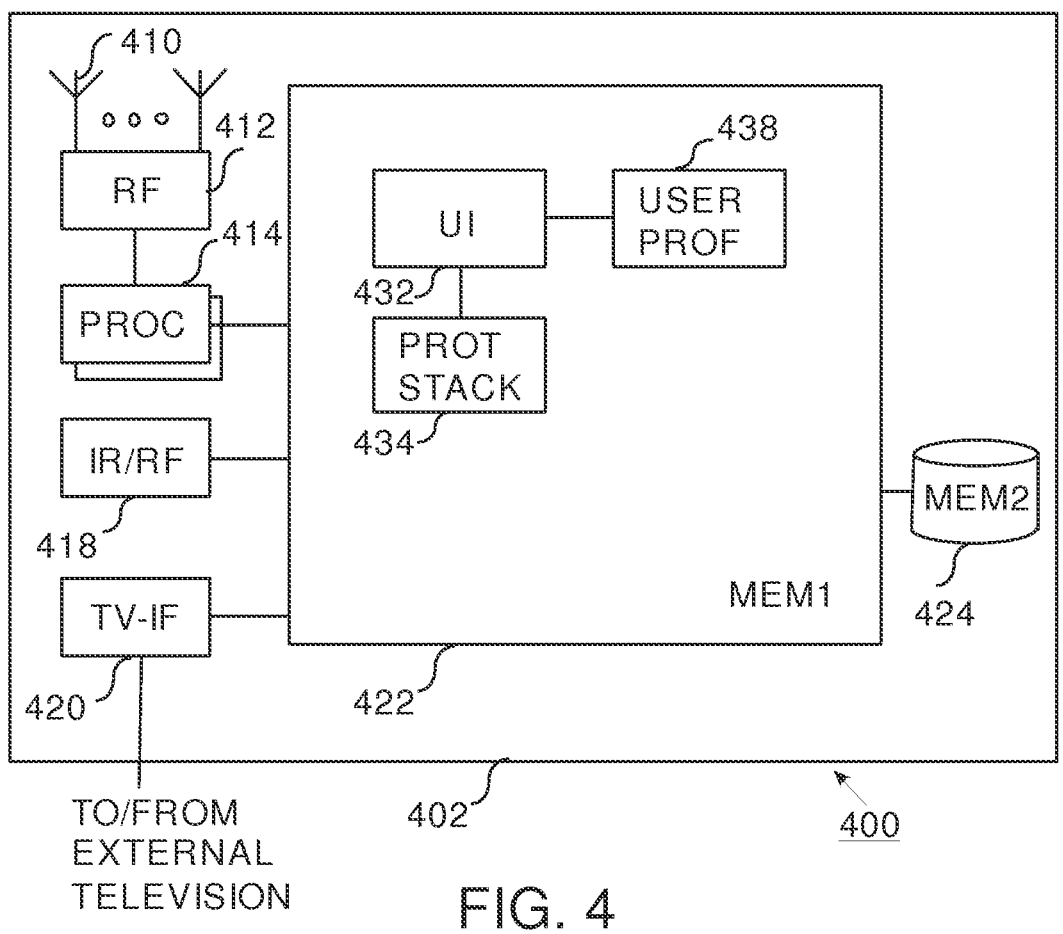
FIG. 4 is a block diagram of an apparatus according to one embodiment of the invention.

FIG. 4 is a block diagram illustrating an apparatus according to one embodiment of the invention. In FIG. 4 there is an apparatus 400, which is, for example, a browser node, a mobile node, user equipment, a handset, a cellular phone, a mobile terminal, an Application Specific Integrated Circuit (ASIC), a chip or a chipset. The internal functions of apparatus 400 are illustrated with a box 402. Apparatus 400 may comprise at least one antenna 410. There may also be multiple input and output antennas. In association with mobile node there is Radio Frequency (RF) circuit 412. RF circuit 412 may be also any circuit or may be referred to as circuit 412. RF circuit 412 is communicatively connected to at least one processor 414. Connected to processor 414 there may be a first memory 422, which is, for example, a Random Access Memory (RAM). There may also be a second memory 424, which may be a non-volatile memory, for example, an optical or magnetic disk. There may also be an infrared or radio frequency (IR/RF) transmitter/receiver 418. There may also be an optional interface 420 to an external television (not shown).

In memory 422 there may be stored software relating to functional entities 432 and 434. A user interface entity 432 may provide a graphical user interface to be displayed on a screen, e.g. on a television screen connected to the browser node 400 via the interface 420. The user interface entity 432 may also transmit a user identity associated with a currently active user profile 438 to an external content server or node (not shown). The user interface entity 432 may communicate with an external remote control unit (not shown) via the infrared or radio frequency (IR/RF) transmitter/receiver 418. The User interface entity 432 communicates with a base station using a protocol stack 434. In another embodiment, the apparatus 400 may comprise network interface means other than the RF circuit 412.

Protocol stack entity 434 comprises control plane protocol functions related to the interface e.g. towards a base station such as, for example, a UMTS Node B. Protocol stack entity 434 may also comprise protocol functionalities related to user plane data communication with the content server. Protocol stack entity 434 may be, for example, an internet protocol stack.

When the at least one processor 414 executes functional entities associated with the invention, memory 422 comprises entities such as, any of the functional entities 432 and 434. The functional entities within the apparatus 400 illustrated in FIG. 4 may be implemented in a variety of ways. They may be implemented as processes executed under the native operating system of the network node. The entities may be implemented as separate processes or threads or so that a number of different entities are implemented by means of one process or thread. A process or a thread may be the instance of a program block comprising a number of routines, that is, for example, procedures and functions. The functional entities may be implemented as separate computer programs or as a single computer program comprising several routines or functions implementing the entities. The program blocks are stored on at least one computer readable medium such as, for example, a memory circuit, memory card, magnetic or optical disk. Some functional entities may be implemented as program modules linked to another functional entity. The functional entities in FIG. 4 may also be stored in separate memories and executed by separate processors, which communicate, for example, via a message bus or an internal network within the network node. An example of such a message bus is the Peripheral Component Interconnect (PCI) bus.

Benefits of at least one or more embodiments of the invention comprise an improved and new way to present user-specific content.

The exemplary embodiments of the invention can be included within any suitable device, for example, including any suitable servers, workstations, PCs, laptop computers, PDAs, Internet appliances, handheld devices, cellular telephones, wireless devices, other devices, and the like, capable of performing the processes of the exemplary embodiments, and which can communicate via one or more interface mechanisms, including, for example, Internet access, telecommunications in any suitable form (for instance, voice, modem, and the like), wireless communications media, one or more wireless communications networks, cellular communications networks, 3 G communications networks, 4 G communications networks Public Switched Telephone Network (PSTNs), Packet Data Networks (PDNs), the Internet, intranets, a combination thereof, and the like.

It is to be understood that the exemplary embodiments are for exemplary purposes, as many variations of the specific hardware used to implement the exemplary embodiments are possible, as will be appreciated by those skilled in the hardware art(s). For example, the functionality of one or more of the components of the exemplary embodiments can be implemented via one or more hardware devices, or one or more software entities such as modules.

The exemplary embodiments can store information relating to various processes described herein. This information can be stored in one or more memories, such as a hard disk, optical disk, magneto-optical disk, RAM, and the like. The databases can be organized using data structures (e.g., records, tables, arrays, fields, graphs, trees, lists, and the like) included in one or more memories or storage devices listed herein. The processes described with respect to the exemplary embodiments can include appropriate data structures for storing data collected and/or generated by the processes of the devices and subsystems of the exemplary embodiments in one or more databases.

All or a portion of the exemplary embodiments can be implemented by the preparation of one or more application-specific integrated circuits or by interconnecting an appropriate network of conventional component circuits, as will be appreciated by those skilled in the electrical art(s).

As stated above, the components of the exemplary embodiments can include computer readable medium or memories according to the teachings of the present inventions and for holding data structures, tables, records, and/or other data described herein. Computer readable medium can include any suitable medium that participates in providing instructions to a processor for execution. Such a medium can take many forms, including but not limited to, non-volatile media, volatile media, transmission media, and the like. Non-volatile media can include, for example, optical or magnetic disks, magneto-optical disks, and the like. Volatile media can include dynamic memories, and the like. Transmission media can include coaxial cables, copper wire, fiber optics, and the like. Transmission media also can take the form of acoustic, optical, electromagnetic waves, and the like, such as those generated during radio frequency (RF) communications, infrared (IR) data communications, and the like. Common forms of computer-readable media can include, for example, a floppy disk, a flexible disk, hard disk, magnetic tape, any other suitable magnetic medium, a CD-ROM, CDRW, DVD, any other suitable optical medium, punch cards, paper tape, optical mark sheets, any other suitable physical medium with patterns of holes or other optically recognizable indicia, a RAM, a PROM, an EPROM, a FLASH-EPROM, any other suitable memory chip or cartridge, a carrier wave or any other suitable medium from which a computer can read.

While the present inventions have been described in connection with a number of exemplary embodiments, and implementations, the present inventions are not so limited, but rather cover various modifications, and equivalent arrangements, which fall within the purview of prospective claims.

The embodiments of the invention described herein may be used in any combination with each other. Several of the embodiments may be combined together to form a further embodiment of the invention.

It is obvious to a person skilled in the art that with the advancement of technology, the basic idea of the invention may be implemented in various ways. The invention and its embodiments are thus not limited to the examples described above; instead they may vary within the scope of the claims.

The invention claimed is:

1. A method, comprising:
arranging, by a processor, user-specific information content packages into a sequence of selectable objects, wherein a user-specific information content package in the sequence of selectable objects comprises at least visual content, and wherein the sequence of selectable objects comprises a first part and a second part, the first part including selectable objects waiting to be displayed on a graphical user interface, the second part including selectable objects that are currently displayed on the graphical user interface;
displaying the selectable objects of the second part of the sequence on the graphical user interface as a moving flow of selectable objects, such that, while the selectable objects flow on the graphical user interface, at least one selectable object from the first part of the sequence is moved into the second part of the sequence and is displayed on the graphical user interface and at least one selectable object from the second part is removed from the second part and is no longer displayed on the graphical user interface;
presenting at least one selectable object from the second part of the sequence that is being displayed on the graphical user interface in a more visually emphasized manner on the graphical user interface than other selectable objects from the second part that are simultaneously displayed on the graphical user interface;
allowing user selection of a selectable object from the second part of the sequence that is being displayed on the graphical user interface;
setting a threshold for an amount of selectable objects in the first part; and
initiating a process of receiving new selectable objects to be added to the first part when the amount of the selectable objects in the first part is less than the threshold amount.

2. The method according to claim 1, further comprising:
receiving at least one user-specific information content package from a server.

3. The method according to claim 2, further comprising prior to receiving user-specific information content packages from the server:
sending, to the server, user profile information.

4. The method according to claim 1, further comprising:
removing a selectable object from the second part of the sequence of selectable objects from the graphical user interface when a predetermined condition is reached.

5. The method according to claim 4, wherein determining that the predetermined condition is reached comprises one or more of:
detecting that a selectable object from the second part of the sequence has reached a predetermined location on the graphical user interface; or
determining that the selectable object is displayed in the more visually enhanced manner and has not been selected.

6. The method according to claim 1, wherein a user-specific information content package comprises an address link to a source content, the method further comprising:
detecting a selection of a selectable object from the second part being displayed on the graphical user interface;
removing the selected selectable object from the second part of the sequence so that it is no longer displayed on the graphical user interface; and
opening the source content associated with the address link relating to the selected object.

7. The method according to claim 1, wherein a user-specific information content package comprises an address, the method further comprising:
detecting a selection of a selectable object from the second part being displayed on the graphical user interface; and
initiating a sending of an indication to the address that the selectable object from the second part has been selected.

8. The method according to claim 1, further comprising:
setting a period of validity for a selectable object in one or more of the first part and the second part of the sequence; and
removing the selectable object from the sequence when the period of validity has expired.

9. The method according to claim 1, further comprising:
setting a priority for at least one selectable object in the first part; and
using the priority information as a basis for moving selectable objects from the first part to the second part of the sequence.

10. The method according to claim 1, wherein the flow of selectable objects in the second part is one or more of a continuous flow or a gradual flow and the selectable objects in the second part move in random directions on the graphical user interface.

11. The method according to claim 1, wherein a selectable object comprises an application.

12. A computer readable medium comprising program code configured to perform, when executed by an apparatus, the method of claim 1.

13. An apparatus, comprising:
at least one processor; and
at least one memory comprising program code, which when executed by the at least one processor, causes the apparatus to:
arrange user-specific information content packages into a sequence of selectable objects, wherein each user-specific information content package comprises at least visual content, and wherein the sequence comprises a first part and a second part, the first part including selectable objects waiting to be displayed on a graphical user interface and the second part including selectable objects currently being displayed on the graphical user interface;
cause display of the selectable objects from the second part on the graphical user interface as a moving flow of selectable objects such that, while the selectable objects of the second part flow on the graphical user interface, at least one selectable object from the first part is moved to the second part and at least one selectable object from the second part is removed from the second part and is no longer displayed on the graphical user interface, wherein in at least one point of time at least one selectable object from the second part that is being displayed on the graphical user interface is more visually emphasized on the graphical user interface than any remaining selectable objects of the second part that simultaneously displayed on the graphical user interface;

allow user selection of a selectable object from the second part being displayed on the graphical user interface;

set a threshold for an amount of selectable objects in the first part of the sequence; and initiate a process of receiving new selectable objects when the amount of the selectable objects in the first part of the sequence is less than the threshold amount.

14. The apparatus according to claim 13, wherein the at least one memory comprises program code, which when executed by the at least one processor, causes the apparatus to:

receive at least one user-specific information content package from a server.

15. The apparatus according to claim 14, wherein the at least one memory comprises program code, which when executed by the at least one processor, causes the apparatus to:

send, to the server, user profile information prior to receiving user-specific information content packages from the server.

16. The apparatus according to claim 13, wherein the at least one memory comprises program code, which when executed by the at least one processor, causes the apparatus to:

remove a selectable object from the second part of the sequence so that the selectable object is not displayed on the graphical user interface when a predetermined condition is reached.

17. The apparatus according to claim 16, wherein the predetermined condition comprises one or more of:

a location of the selectable object on the graphical user interface or determining that the selectable object is displayed in a more visually emphasized manner and has not been selected.

18. The apparatus according to claim 13, wherein the at least one memory comprises program code, which when executed by the at least one processor, causes the apparatus to:

set a period of validity for a selectable object in the sequence; and remove the selectable object from the sequence when the period of validity has expired.

19. The apparatus according to claim 13, wherein the at least one memory comprises program code, which when executed by the at least one processor, causes the apparatus to:

set a priority for at least one selectable object in the first part of the sequence; and use the priority information as a basis for moving selectable objects from the first part of the sequence to the second part of the sequence.

* * * * *